(12) United States Patent
Petrosino (10) Patent No.: US 12,117,117 B2
(45) Date of Patent: Oct. 15, 2024

(54) UNIVERSAL CAPS FOR THE LOW AND HIGH SIDE REFRIGERANT SERVICE PORTS OF AN AIR CONDITIONING SYSTEM

(71) Applicant: Frank Amidio Petrosino, Charlotte, NC (US)

(72) Inventor: Frank Amidio Petrosino, Charlotte, NC (US)

( * ) Notice: Subject to any disclaimer, the term of this patent is extended or adjusted under 35 U.S.C. 154(b) by 322 days.

(21) Appl. No.: 17/730,743

(22) Filed: Apr. 27, 2022

(65) Prior Publication Data

US 2022/0349510 A1 Nov. 3, 2022

Related U.S. Application Data (60) Provisional application No. 63/181,127, filed on Apr. 28, 2021.

(51) Int. Cl.
  *F16L 55/115* (2006.01)
  *F25B 45/00* (2006.01)

(52) U.S. Cl.
  CPC .......... *F16L 55/1157* (2013.01); *F25B 45/00* (2013.01); *F25B 2345/006* (2013.01); *F25B 2500/221* (2013.01)

(58) Field of Classification Search
  CPC ..... F16L 55/115; F16L 55/1157; F25B 45/00; F25B 2345/006; F16J 13/12; F16K 1/465
  USPC .................. 138/89, 89.1–89.4; 285/45, 901; 137/614.02, 614.04–614.6, 322; 251/149.1, 149.6, 148, 147
  See application file for complete search history.

(56) References Cited

U.S. PATENT DOCUMENTS

| | | | | |
|---|---|---|---|---|
| 2,926,700 A * | 3/1960 | Franck | ............... | F16L 37/0844 |
| | | | | 138/89 |
| 4,095,713 A * | 6/1978 | Norton | .................. | B65D 41/46 |
| | | | | 220/270 |
| 4,253,488 A * | 3/1981 | Leverberg | ............... | F16L 29/02 |
| | | | | 251/149.6 |
| 4,712,705 A * | 12/1987 | Fuehrer | ................. | B65D 41/48 |
| | | | | 215/256 |
| 6,546,952 B1 | 4/2003 | Martin et al. | | |
| 6,877,529 B2 | 4/2005 | Bernini | | |
| 7,516,942 B2 | 4/2009 | Grau et al. | | |
| 7,730,735 B2 | 6/2010 | Maruya et al. | | |
| 8,313,123 B1* | 11/2012 | Hinkle | ................. | F16L 55/1157 |
| | | | | 285/901 |
| 8,826,941 B2* | 9/2014 | Saito | ...................... | F16J 15/062 |
| | | | | 138/92 |
| 10,900,603 B2 | 1/2021 | Attia | | |
| 2008/0289353 A1* | 11/2008 | Maruya | .................. | F25B 45/00 |
| | | | | 137/322 |

(Continued)

*Primary Examiner* — Patrick F Brinson
(74) *Attorney, Agent, or Firm* — Jeffrey C. Watson, Esq.; Grell & Watson Patent Attorneys LLC (57) ABSTRACT

A universal cap configured for sealing a refrigerant service port of an air conditioning system includes a cap body with a closed end and a connection end. The connection end is configured to attach and seal the cap body to a universal quick disconnect exterior of the refrigerant service port. Wherein the universal cap is designed and configured to prevent refrigerant from leaking from the refrigerant service port. Wherein the closed end of the cap body does not include any holes, openings, or fittings, wherein the only hole, opening or fitting of the cap body is via the connection end.

17 Claims, 6 Drawing Sheets

(56) References Cited

U.S. PATENT DOCUMENTS

| | | |
|---|---|---|
| 2014/0020781 A1 | 1/2014 | Holt et al. |
| 2014/0069133 A1 | 3/2014 | Becker |
| 2014/0345122 A1* | 11/2014 | Durall ................ B60H 1/00585 29/726 |
| 2019/0195412 A1* | 6/2019 | Attia ....................... F25B 45/00 |
| 2019/0232752 A1 | 8/2019 | Bloom et al. |

* cited by examiner

UNIVERSAL CAPS FOR THE LOW AND HIGH SIDE REFRIGERANT SERVICE PORTS OF AN AIR CONDITIONING SYSTEM

CROSS-REFERENCE TO RELATED APPLICATIONS

This application claims benefit to U.S. Provisional Patent Application No. 63/181,127 filed on Apr. 28, 2021 entitled UNIVERSAL A/C CAP FOR THE LOW AND HIGH SIDE OF ANY 134a REFRIGERANT, which is incorporated by reference in its entirety.

FIELD OF THE DISCLOSURE

The present disclosure relates to air conditioning ("A/C") systems that use refrigerant, like automobile A/C systems used to cool the air in a vehicle, or the like, and the servicing thereof, like servicing the refrigerant used in such A/C systems. More specifically, the instant disclosure is directed to a universal cap for the low and high side refrigerant service ports of such A/C systems, like the refrigerant service ports for any 134a refrigerant, R-1234YF refrigerant, or the like.

BACKGROUND

Generally speaking, automobile A/C system access ports are used to service the A/C system, like for recovery/recharge, monitor and repair the air conditioning system. There are a few different automotive air conditioning service valve ports. The high side service valve port, low side service valve port, manufacturer assembly plant access port and ports for a/c pressure switches or sensors. The quality and safety standards for automotive air conditioning service valve ports are set by SAE J-639. The high side service port is a fitting that provides access to the high-pressure side of the AC system and the low side service port is a fitting that provides access to the low-pressure side of the AC system. The instant disclosure may be specifically directed to universal caps for sealing the high side service port and the low side service port.

The high side service port and the low side service port typically use Schrader valves for the primary seal integrated valve. The high side refrigerant service port may include a two-piece valve, or a one-piece valve, like the 10 mm valve core. The low side refrigerant service port may also include such two-piece Shrader valves, or a one-piece valve, like the 8 mm valve core. The instant disclosure recognizes the sealing and/or leaking problems associated with such Shrader valves used in the high side and/or the low side refrigerant ports of automobile A/C systems. Contamination may be the greatest enemy of A/C system durability, and of A/C Schrader valve leaks in the high side and low side service ports. Contamination could range from dirt, metallic debris generated during installation of the valve core in its port, to air or moisture. Any debris inside the system will be pulled during the refrigerant recovery process and may become lodged in the Schrader valve causing it to remain open and leak. Very Often damage to a valve core happens after the a/c system has been serviced and the servicing machine has been disconnected from the service ports. Temperature may be another factor that could cause damage to the seals of any valve core. As such, there is clearly a need to provide a means and/or mechanism for sealing such high side and/or low side refrigerant ports of automobile A/C systems to help prevent leaks from the Schrader valves used therein.

Currently, the high side and low side refrigerant ports of automobile A/C systems are fitted with various closure caps. These closure caps are typically plastic and vary in color, shape, size, sealing mechanisms, etc. These closure caps should be finger tight. There is no single cap torque recommendation. All ports include specific thread features to attach a specific closure cap, which can vary depending on the manufacturer of the automobile and/or the A/C system. As these closure caps vary based on the manufacturer of the automobile and/or A/C system, a service technician of such automobile A/C systems may be tasked with keeping knowledge and stock of countless different service port closure caps. In addition, the sole purpose of these plastic service port closure caps is to close the open end of the refrigerant service ports to prevent contamination from entering the refrigerant service ports. Although these caps include a rubber seal designed to fit around the port mouth, these plastic caps are not adequate to seal leaks from the Schrader valves for sealing the service ports from such leaks. As such, there is clearly a need to provide a universal cap for the high end and low-end refrigerant service ports of automobile A/C systems to reduce the need for the various styles, colors, shapes, sizes etc. of closure caps needed by service technicians, and to aid in sealing the refrigerant service ports to prevent leaks from such refrigerant service ports.

The instant disclosure may be designed to address at least certain aspects of the problems or needs discussed above by providing a universal cap for the low and high side refrigerant service ports of an automobile air conditioning system.

SUMMARY

The present disclosure may solve the aforementioned limitations of the currently available refrigerant port caps for air conditioning systems, by providing a universal cap. The universal cap may be for sealing a refrigerant service port of an air conditioning system. The universal cap may generally include a cap body with a closed end and a connection end. The connection end is configured to attach and seal the cap body to a universal quick disconnect exterior of the refrigerant service port. Wherein the universal cap is designed and configured to prevent refrigerant from leaking from the refrigerant service port. Wherein the closed end of the cap body does not include any holes, openings, or fittings, wherein the only hole, opening or fitting of the cap body is via the connection end.

One feature of the disclosed universal cap for sealing a refrigerant service port of an air conditioning system may be that the connection end can include at least one seal. The at least one seal may be configured to seal the connection end to any portion of the refrigerant service port, including, but not limited to, the universal quick disconnect exterior of the refrigerant service port, a top of the refrigerant service port, an interior of the refrigerant service port, the like, and/or a combination thereof. In select embodiments, the at least one seal may include an outer seal. The outer seal may be an outer O-ring type seal. This outer O-ring type seal may be positioned in an outer groove in the connection end of the cap body. Wherein, when the universal cap is attached to the refrigerant service port, the outer seal may be configured to compress against the universal quick disconnect exterior of the refrigerant service port. In other select embodiments, the at least one seal may include an upper seal. The upper seal may be an upper O-ring type seal positioned in an upper groove in the connection end of the cap body. Wherein, when the universal cap is attached to the refrigerant service port, the upper seal is configured to compress against the top of the refrigerant service port.

Another feature of the disclosed universal cap for sealing a refrigerant service port of an air conditioning system may be the inclusion of a positioning protrusion. The positioning protrusion may be included with the connection end of the cap body. The positioning protrusion may be sized to fit into an interior of the refrigerant service port. Wherein, when the universal cap is attached to the refrigerant service port, the positioning protrusion may be configured to aid in positioning and securing the universal cap on the refrigerant service port. Wherein the positioning protrusion may be sized and configured not to contact or depress a valve pin of a valve in the refrigerant service port. In select embodiments, the positioning protrusion may be positioned between an upper seal being an upper O-ring type seal positioned in an upper groove in the connection end of the cap body. Wherein, when the universal cap is attached to the refrigerant service port, the upper seal may be configured to compress against the top of the refrigerant service port as the positioning protrusion is inserted and positioned inside of the interior of the refrigerant service port.

Another feature of the disclosed universal cap for sealing a refrigerant service port of an air conditioning system may be that the connection end can include a quick disconnect fitting. The quick disconnect fitting may be configured to releasably attach the cap body to the universal quick disconnect exterior of the refrigerant service port. In select embodiments, the quick disconnect fitting may include an inner body member, an outer sleeve, and a plurality of ball bearing members. The inner body member may be configured to fit around the universal quick disconnect exterior of the refrigerant service port. The outer sleeve may be configured to traverse along the inner body member. The plurality of ball bearing members may be configured to move partially within a plurality of holes in the inner body member when the outer sleeve is slid down over the plurality of ball bearing members. Wherein, when the universal cap is inserted onto the refrigerant service port with the inner body member around the universal quick disconnect exterior of the refrigerant service port and the outer sleeve is slid down over the plurality of ball bearing members, the plurality of ball bearing members may be forced partially through the plurality of holes in the inner body member and into a locking slot in the universal quick disconnect exterior of the refrigerant service port, thereby locking the universal cap onto the refrigerant service port. Conversely, when the outer sleeve is slid up off of the plurality of ball bearing members, the plurality of ball bearing members is allowed to retract from the plurality of holes in the inner body member and out of the locking slot in the universal quick disconnect exterior of the refrigerant service port, thereby unlocking the universal cap from the refrigerant service port for removal of the universal cap. In select embodiments, when the universal cap is locked onto the refrigerant service port via the plurality of ball bearing members positioned into the locking slot in the universal quick disconnect exterior of the refrigerant service port, the outer seal being the outer O-ring type seal positioned in the outer groove in the connection end of the cap body may be configured to be compressed against the universal quick disconnect exterior of the refrigerant service port for sealing the refrigerant service port. In other select embodiments, when the universal cap is locked onto the refrigerant service port via the plurality of ball bearing members positioned into the locking slot in the universal quick disconnect exterior of the refrigerant service port, the upper seal being the upper O-ring type seal positioned in the upper groove in the connection end of the cap body may be configured to be compressed against the top of the refrigerant service port for sealing the refrigerant service port. In other select possibly preferred embodiments, when the universal cap is locked onto the refrigerant service port via the plurality of ball bearing members positioned into the locking slot in the universal quick disconnect exterior of the refrigerant service port: the outer seal being the outer O-ring type seal positioned in the outer groove in the connection end of the cap body may be configured to be compressed against the universal quick disconnect exterior of the refrigerant service port for sealing the refrigerant service port; and the upper seal being the upper O-ring type seal positioned in the upper groove in the connection end of the cap body may be configured to be compressed against the top of the refrigerant service port for sealing the refrigerant service port.

Another feature of the disclosed universal cap for sealing a refrigerant service port of an air conditioning system may be the inclusion of an adjustment feature. The adjustment feature may include a rotatable knob extending from a top of the closed end of the cap body. The rotatable knob may be in communication with a thread down inset inside of the cap body. Wherein, the rotatable knob may be configured to raise and lower the thread down inset inside of the cap body. Wherein, when the connection end is attached and sealed to the refrigerant service port, the adjustment feature may be configured to lower the thread down inset to seat onto a top of the refrigerant service port for stabilizing the connection and seal between the connection end of the universal cap and the refrigerant service port. In select embodiments, the thread down inset may include the upper seal being the upper O-ring type seal positioned in the upper groove in the thread down inset. Wherein, when the thread down inset is lowered and seated onto the top of the refrigerant service port, the upper O-ring type seal may be configured to be compressed against the top of the refrigerant service port for sealing the refrigerant service port. In select embodiments, wherein the thread down inset may further include the positioning protrusion positioned between the upper O-ring type seal positioned in the upper groove in the connection end of the cap body. Wherein, when the connection end is attached and sealed to the refrigerant service port, the adjustment feature may be configured to lower the positioning protrusion further into the refrigerant service port for stabilizing the connection and seal between the connection end of the universal cap and the refrigerant service port.

Another feature of the disclosed universal cap for sealing a refrigerant service port of an air conditioning system may be that the universal cap can be configured and designed for a low side refrigerant service port of the air conditioning system or a high side refrigerant service port of the air conditioning system. In select embodiments, the universal cap may be designed and configured for a low side HFC-134a refrigerant service port. In other select embodiments, the universal cap may be designed and configured for a high side HFC-134a refrigerant service port. In other select embodiments, the universal cap may be designed and configured for a low side 1234yf refrigerant service port. In other select embodiments, the universal cap may be designed and configured for a high side 1234yf refrigerant service port.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1A:
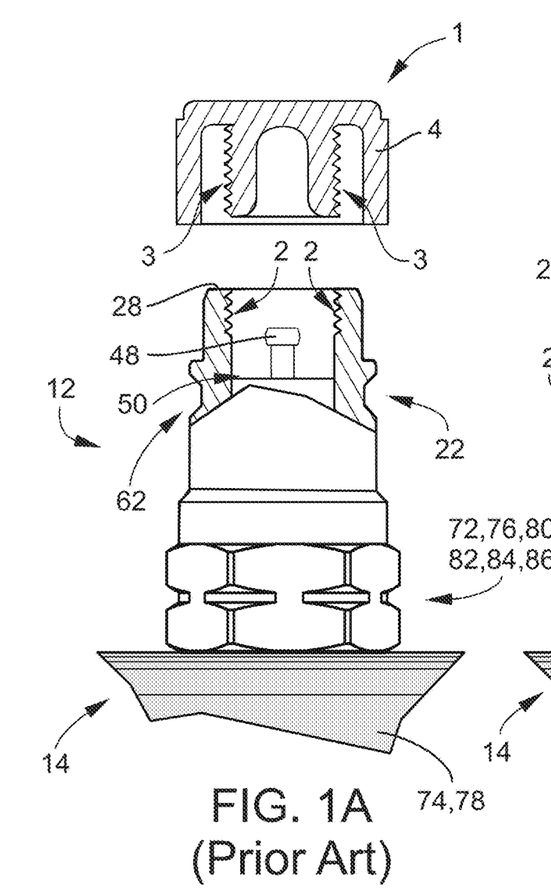
FIG. 1A is a side view of a partially broken away service port cap and refrigerant service port for an air conditioning system according to the prior art with the service port cap detached from the refrigerant service port.
Figure 1B:
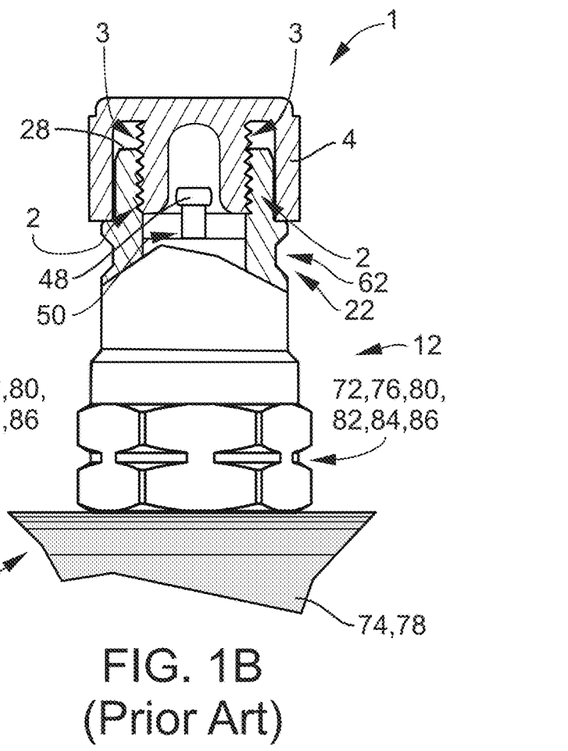
FIG. 1B is a side view of the partially broken away service port cap and refrigerant service port for an air conditioning system according to the prior art with the service port cap attached to the refrigerant service port.
Figure 2:
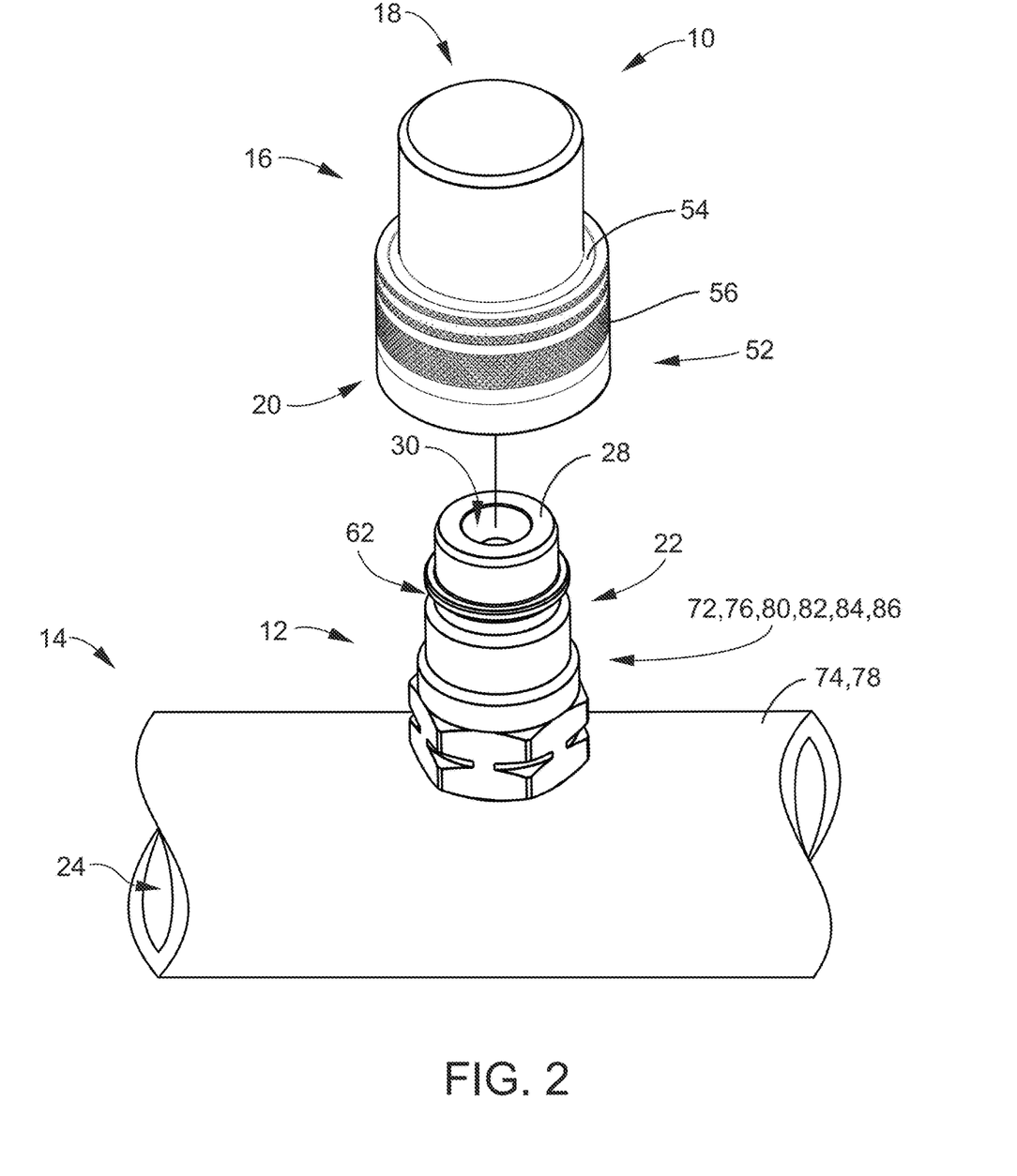
FIG. 2 is a top environmental perspective view of the universal cap for sealing a refrigerant service port of an air conditioning system according to select embodiments of the instant disclosure showing the universal cap positioned for attachment on the refrigerant service port on an air conditioning system.
Figures 3A, 3B, 3C, 3D:
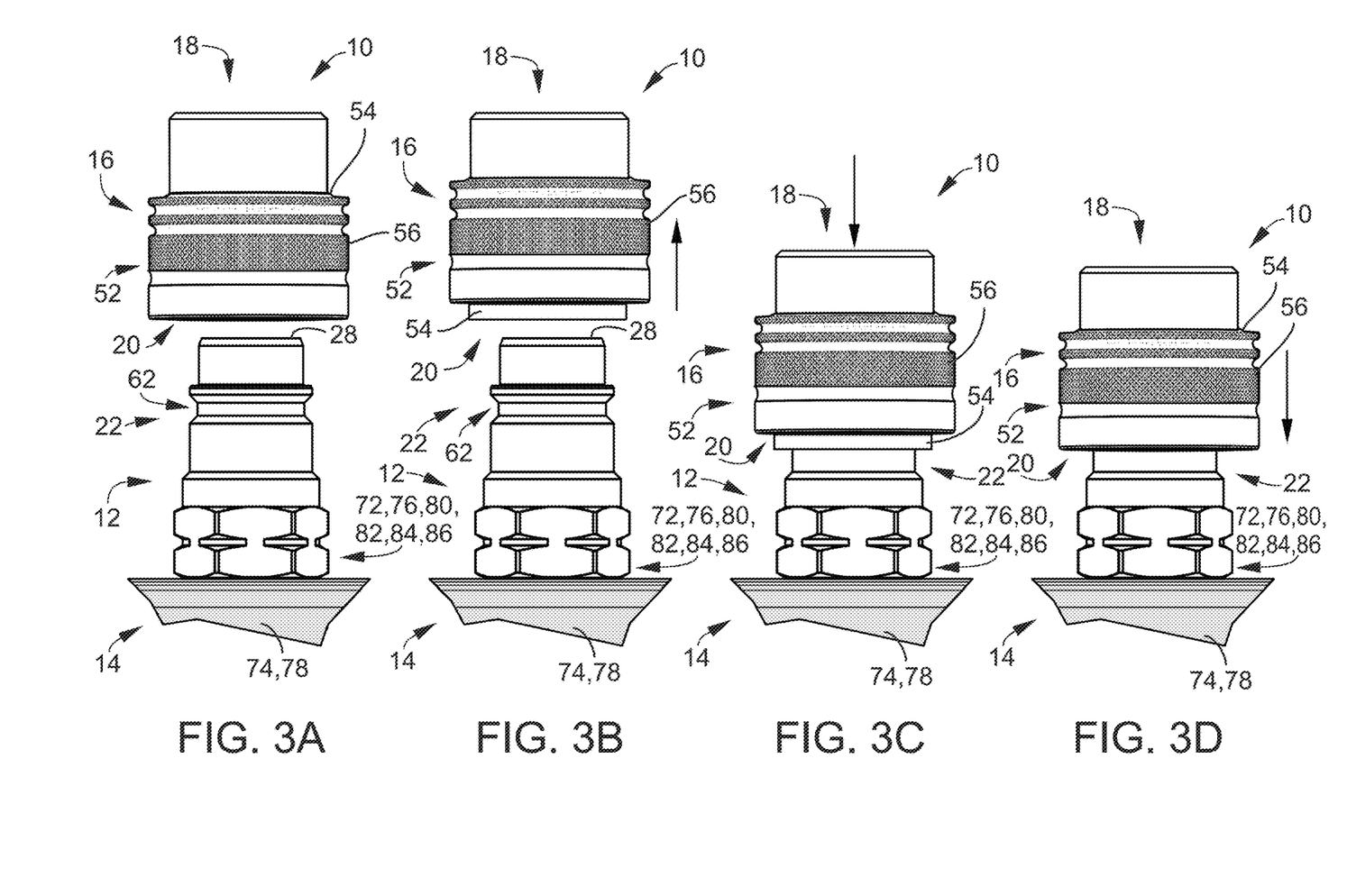
FIG. 3A is an environmental side view of the universal cap for sealing a refrigerant service port of an air conditioning system according to select embodiments of the instant disclosure showing the universal cap positioned for attachment on the refrigerant service port on an air conditioning system.
FIG. 3B is another environmental side view of the universal cap from FIG. 3A with the outer sleeve of the quick disconnect fitting lifted up for attachment to the refrigerant service port.
FIG. 3C is another environmental side view of the universal cap from FIG. 3A with the outer sleeve of the quick disconnect fitting lifted up and the inner body member positioned over the universal quick disconnect exterior of the refrigerant service port.
FIG. 3D is another environmental side view of the universal cap from FIG. 3A with the inner body member positioned over the universal quick disconnect exterior of the refrigerant service port and the outer sleeve of the quick disconnect fitting slid down locking the universal cap onto the refrigerant service port via the plurality of ball bearing members being forced into the locking slot of the universal quick disconnect exterior of the refrigerant service port.

Referring to FIGS. 1A and 1B, a plastic cap 1 of the prior art is shown that is used for capping or closing refrigerant service port 12. This plastic cap 1 of the prior art is made of plastic material 4. As shown in these Figures, plastic cap 1 of the prior art is designed to attach to refrigerant service port 12 via internal threads 2 of refrigerant service port 12. As such, plastic cap 1 of the prior art includes cap threads on the inside of the cap configured to attach to internal threads 2 of refrigerant service port 12. As discussed earlier, different manufacturer's of various automobiles or the like, and or for various air conditioning systems 14, utilize various styles, shapes, sizes, colors, etc. of plastic cap 1 of the prior art and have various cap threads 3 of such various plastic caps 1 of the prior art to fit various internal threads 2 of their particular refrigerant service port. To make things even more complicated, the low pressure refrigerant side 74 with low pressure refrigerant service port 72 of various air conditioning systems 14 may have different styles, shapes, sizes, colors, etc. of plastic caps 1 of the prior art than high pressure refrigerant side 78 with high side refrigerant service port 76 of various air conditioning systems 14 with various cap threads 3 for the internal threads 2 of the associated refrigerant service port 12. Further complicating things, various air conditioning systems with different refrigerants, like HFC-134a refrigerant, 1234yf refrigerant, or the like, may have different styles, shapes, sizes, colors, etc. of plastic caps 1 with various cap threads 3 for the internal threads 2 of the associated refrigerant service port 12 of air conditioning system 14 with the type of refrigerant used. As such, as examples, and clearly not limited thereto, plastic cap 1 of the prior art may have various styles, shapes, sizes, colors, etc. for low side HFC-134a refrigerant service port 80, high side HFC-134a refrigerant service port 82, low side 1234yf refrigerant service port 84, high side 1234yf refrigerant service port 86, the like, etc. As such, an air conditioning service technician may be required to have the inventory and knowledge of a vast number of plastic caps 1 of the prior art, which may lead to confusion in locating the desired service port 12 and added expenses in time and cost associated with the vast number of such plastic caps 1 of the prior art.

Still referring to FIGS. 1A and 1B, plastic cap 1 of the prior art is shown. In FIG. 1B, plastic cap 1 is shown attached to refrigerant service port 12 utilizing internal threads 2 of refrigerant service port 12. Plastic cap 1 of the prior art includes cap threads 3 made of plastic material 4 used to thread plastic cap 1 onto refrigerant service port 12. As such, plastic cap 1 of the prior art is not designed or configured to prevent leaks of refrigerant from valve 50 of refrigerant service port 12. Plastic cap 1 of the prior art is merely designed to close or seal off top 28 of refrigerant service port 12 to prevent debris or other materials from entering valve 50 of refrigerant service port 12. In addition, because cap threads 3 and plastic cap 1 is made of plastic material 4, plastic cap threads 3 are easily damaged (like from cross-threading) and plastic cap 1 may also be easily damaged, cracked or punctured.

Referring now to FIGS. 1-6, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring to FIGS. 1-6, the present disclosure may solve the aforementioned limitations of the currently available refrigerant service port caps by providing the disclosed universal cap 10. Universal cap 10 may be for sealing refrigerant service port 12 of air conditioning system 14. Universal cap 10 may generally include cap body 16 with closed end 18 and connection end 20. Universal cap 10 may be designed and configured to prevent refrigerant from leaking from the refrigerant service port 12. Wherein, closed end 18 of cap body 16 may not include any holes, openings, or fittings, wherein the only hole, opening or fitting of cap body 16 may be via connection end 20. Connection end 20 may be configured to attach and seal cap body 16 to universal quick disconnect exterior 22 of refrigerant service port 12. This universal quick disconnect exterior 22 of refrigerant service port 12 may be standard or universal throughout the industry, as it is used for attaching quick disconnect fittings for mechanical manifold gauge sets. However, these quick disconnect fittings may be different for the high pressure refrigerant side 78 and low pressure refrigerant side 74 of air conditioning system 14. As such, universal cap 10 may be designed and configured in various sizes to fit various high side refrigerant service ports 76 and/or various low side refrigerant service ports 72. In addition, older air conditioning systems 14 may utilize HFC-134a refrigerant which is being phased out with newer air conditioning systems which may utilize 1234yf refrigerant. As such, universal cap 10 may be designed and configured in various sizes to fit various refrigerant service ports 12 for various air conditioning systems 14 with various refrigerants, including but not limited to, being sized and configured to fit low side HFC-134a refrigerant service port 80, high side HFC-134a refrigerant service port 82, low side 1234yf refrigerant service port 84, high side 1234yf refrigerant service port 86, the like, etc. However, the instant disclosure is not so limited, and universal cap 10 may be designed, sized, and/or configured to seal off any port that utilizes a quick disconnect type fitting, like with universal quick disconnect exterior 22. As such, as used herein, the term refrigerant service port 12 may include any refrigerant service port or the like with quick disconnect type fitting, like with universal quick disconnect exterior 22.

Referring now specifically to FIGS. 4A, 4B, 6A and 6B, one feature of universal cap 10 for sealing refrigerant service port 12 of air conditioning system 14 may be that connection end 20 can include at least one seal 26. The at least one seal 26 may be configured to seal connection end 20 to any portion of refrigerant service port 12, including, but not limited to, to universal quick disconnect exterior 22 of refrigerant service port 12, top 28 of refrigerant service port 12, interior 30 of refrigerant service port 12, the like, and/or any various combinations thereof. In select embodiments, the at least one seal 26 may include outer seal 32. Outer seal 32 may be outer O-ring type seal 34. This outer O-ring type seal 34 may be positioned in outer groove 36 in connection end 20 of cap body 16. Wherein, when universal cap 10 is attached toe refrigerant service port 12, or the like, outer seal 32 may be configured to compress against universal quick disconnect exterior 22 of refrigerant service port 12. In other select embodiments, the at least one seal 26 may include upper seal 38. Upper seal 38 may be upper O-ring type seal 40 positioned in upper groove 42 in connection end 20 of cap body 16. Wherein, when universal cap 10 is attached to refrigerant service port 12, or the like, upper seal 38 may be configured to compress against top 28 of refrigerant service port 12.

Still referring specifically to FIGS. 4A, 4B, 6A and 6B, another feature of universal cap 10 for sealing refrigerant service port 12 of air conditioning system 14 may be the inclusion of positioning protrusion 46. Positioning protrusion 46 may be included within connection end 20 of cap body 16. Positioning protrusion 46 may be sized to fit into interior 30 of refrigerant service port 12. Wherein, when universal cap 10 is attached to refrigerant service port 12, or the like, positioning protrusion 46 may be configured to aid in positioning and securing universal cap 10 on refrigerant service port 12. Wherein, positioning protrusion 46 may be sized and configured not to contact or depress valve pin 48 of valve 50 in refrigerant service port 12, or the like. This is a key feature of universal cap 10, as it is not designed to open valve 50, like a Schrader valve, or the like, by depressing valve pin 48. As such, unlike most quick disconnect fittings (like ones used with mechanical manifold gauge sets) which are designed and configured with an internal member that is sized to compress valve pin 48 and open valve 50 of refrigerant service port 12, or the like, universal cap 10 is designed so seal off the open top 28 of refrigerant service port 12, or the like, like to prevent leaks from valve 50 inside of refrigerant service port 12. In select embodiments, as shown in the Figures, positioning protrusion 46 may be positioned between upper seal 38 being upper O-ring type seal 40 positioned in upper groove 42 in connection end 20 of cap body 16. Wherein, when universal cap 10 is attached to refrigerant service port 12, or the like, upper seal 38 may be configured to compress against top 28 of refrigerant service port 12 as positioning protrusion 46 is inserted and positioned inside of interior 30 of refrigerant service port 12.

Figures 4A, 4B:
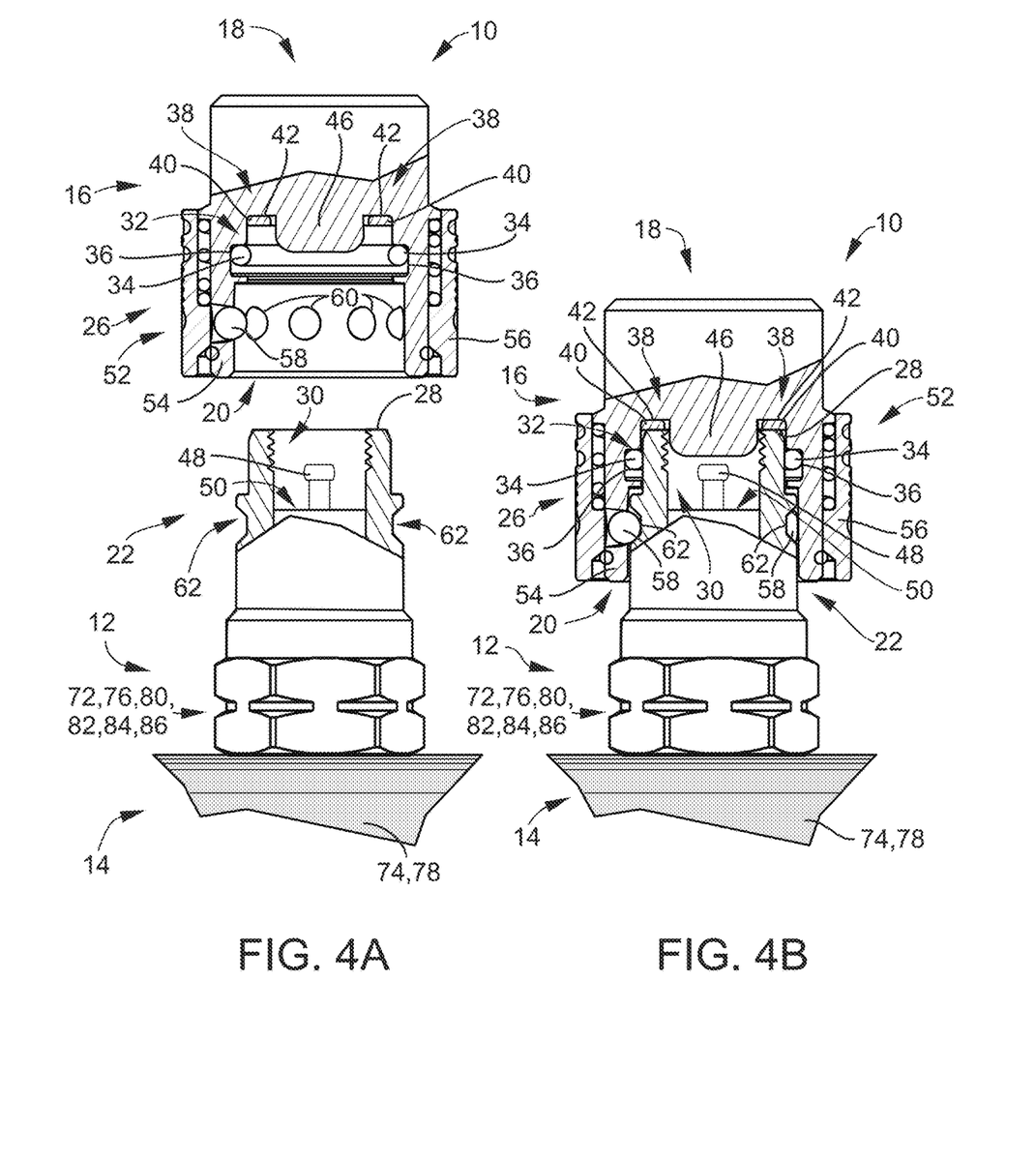
FIG. 4A is an environmental partially broken away side view of the universal cap for sealing a refrigerant service port of an air conditioning system according to select embodiments of the instant disclosure showing the universal cap positioned for attachment on the refrigerant service port on an air conditioning system showing the inner components of the quick disconnect fitting and the positioning of the seals.
FIG. 4B is another environmental side view of the universal cap from FIG. 4A with the inner body member positioned over the universal quick disconnect exterior of the refrigerant service port and the outer sleeve of the quick disconnect fitting slid down locking the universal cap onto the refrigerant service port via the plurality of ball bearing members being forced into the locking slot of the universal quick disconnect exterior of the refrigerant service port, with the outer seal sealed against the universal quick disconnect exterior of the refrigerant service port and the upper seal sealed against the top of the refrigerant service port.
Figure 5:
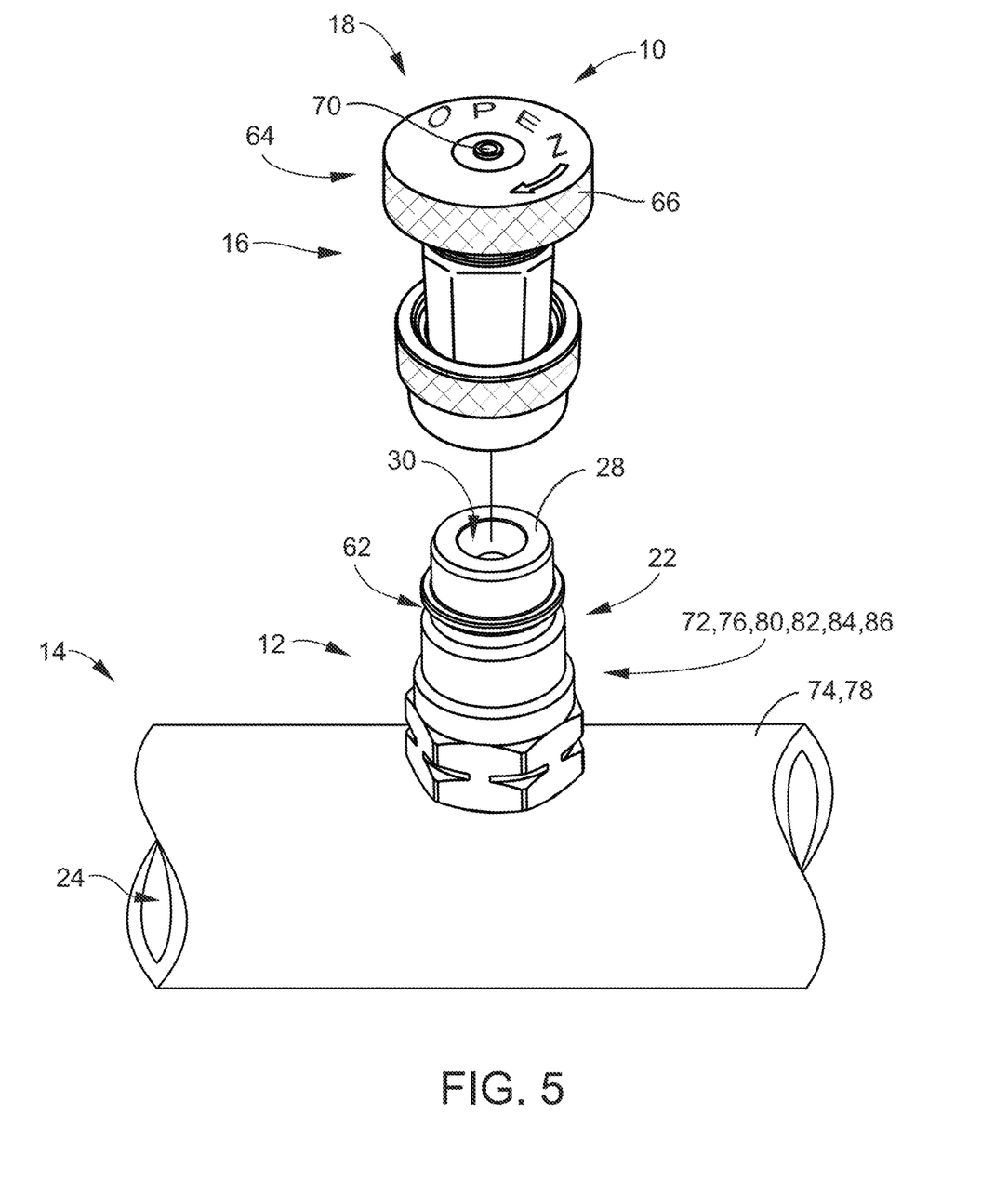
FIG. 5 is a top environmental perspective view of the universal cap for sealing a refrigerant service port of an air conditioning system according to select embodiments of the instant disclosure with the adjustment feature having a rotatable knob off of the closed end of the cap body showing the universal cap positioned for attachment on the refrigerant service port on an air conditioning system.
Figure 6A:
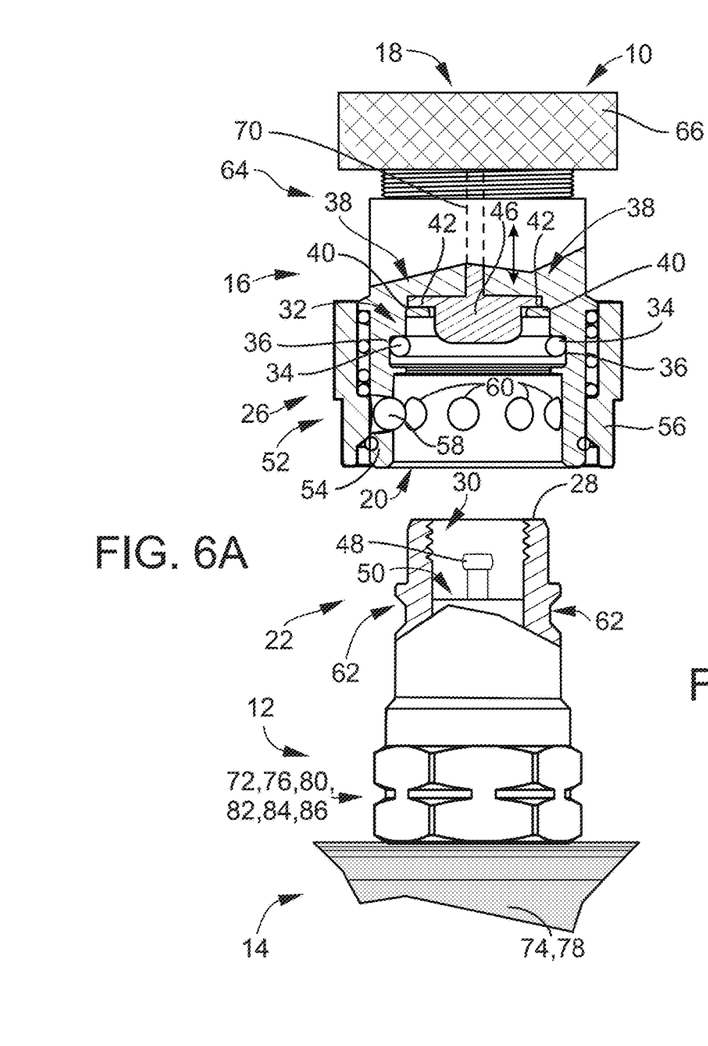
FIG. 6A is an environmental partially broken away side view of the universal cap for sealing a refrigerant service port of an air conditioning system according to select embodiments of the instant disclosure with the adjustment feature having a rotatable knob off of the closed end of the cap body showing the universal cap positioned for attachment on the refrigerant service port on an air conditioning system showing the inner components of the quick disconnect fitting and the positioning of the seals.
Figure 6B:
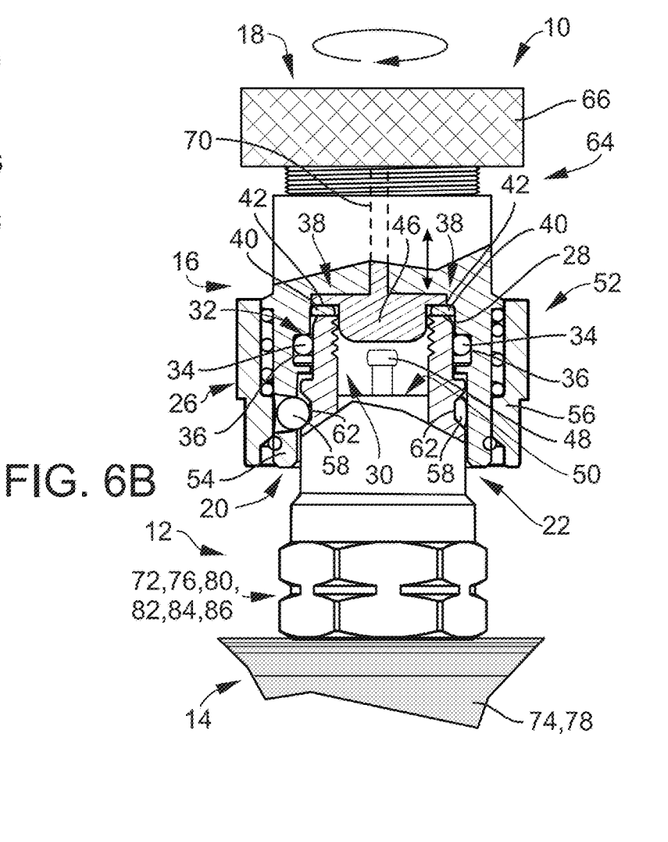
FIG. 6B is another environmental side view of the universal cap from FIG. 6A with the inner body member positioned over the universal quick disconnect exterior of the refrigerant service port and the outer sleeve of the quick disconnect fitting slid down locking the universal cap onto the refrigerant service port via the plurality of ball bearing members being forced into the locking slot of the universal quick disconnect exterior of the refrigerant service port, with the outer seal sealed against the universal quick disconnect exterior of the refrigerant service port and the thread down insert seated with the upper seal seated down and sealed against the top of the refrigerant service port with the positioning protrusion positioned in the interior of the refrigerant service port.

Referring now specifically to FIGS. 2, 3A, 3B, 3C, 3D, 4A, 4B, 5, 6A and 6B, another feature of universal cap 10 for sealing refrigerant service port 12 of air conditioning system 14 may be that connection end 20 can include quick disconnect fitting 52. Quick disconnect fitting 52 may be configured to releasably attach cap body 16 to universal quick disconnect exterior 22 of refrigerant service port 12, or the like. Quick disconnect fitting 52 may be similar to standard quick disconnect fittings, like those used with mechanical manifold gauge sets used to service air conditioning system 14. In select embodiments, as best shown in FIGS. 4A, 4B, 6A and 6B, quick disconnect fitting 52 may include inner body member 54, outer sleeve 56, and a plurality of ball bearing members 58. Inner body member 54 may be configured to fit around universal quick disconnect exterior 22 of refrigerant service port 12, as shown in FIGS. 4B and 6B. Outer sleeve 56 may be configured to traverse along inner body member 54. The plurality of ball bearing members 58 may be configured to move partially within a plurality of holes 60 in inner body member 54 when outer sleeve 56 is slid down over the plurality of ball bearing members 58. Wherein, when universal cap 10 is inserted onto refrigerant service port 12 with inner body member 54 around universal quick disconnect exterior 22 of refrigerant service port 12, or the like, and outer sleeve 56 is slid down over the plurality of ball bearing members 58, the plurality of ball bearing members 58 may be forced partially through the plurality of holes 60 in the inner body member 54 and into locking slot 62 in universal quick disconnect exterior 22 of refrigerant service port 12, thereby locking universal cap 10 onto refrigerant service port 12. Conversely, when outer sleeve 56 is slid up and at least partially off of the plurality of ball bearing members 58, the plurality of ball bearing members 58 is allowed to retract from the plurality of holes 60 in inner body member 54 and out of locking slot 62 in universal quick disconnect exterior 22 of refrigerant service port 12, thereby unlocking universal cap 10 from refrigerant service port 12 for removal of universal cap 12. In select embodiments, as shown in FIGS. 4B and 6B, when universal cap 10 is locked onto refrigerant service port 12 via the plurality of ball bearing members 58 positioned into locking slot 62 in universal quick disconnect exterior 22 of refrigerant service port 12, outer seal 32 being outer O-ring type seal 34 positioned in outer groove 36 in connection end 20 of cap body 16 may be configured to be compressed against universal quick disconnect exterior 22 of refrigerant service port 12 for sealing refrigerant service port 12. In other select embodiments, when universal cap 10 is locked onto refrigerant service port 12 via the plurality of ball bearing members 58 positioned into locking slot 62 in universal quick disconnect exterior 22 of refrigerant service port 12, upper seal 38 being the upper O-ring type seal 40 positioned in upper groove 42 in connection end 20 of cap body 16 may be configured to be compressed against top 28 of refrigerant service port 12 for sealing refrigerant service port 12. In other select possibly preferred embodiments, when universal cap 10 is locked onto refrigerant service port 12 via the plurality of ball bearing members 58 positioned into locking slot 62 in universal quick disconnect exterior 22 of refrigerant service port 12 seals 26 may include the combination of: outer seal 32 being outer O-ring type seal 34 positioned in outer groove 36 in connection end 20 of cap body 16 may be configured to be compressed against universal quick disconnect exterior 22 of refrigerant service port 12 for sealing refrigerant service port 12; and upper seal 38 being upper O-ring type seal 40 positioned in upper groove 42 in connection end 20 of cap body 16 may be configured to be compressed against top 28 of refrigerant service port 12 for sealing refrigerant service port 12.

Referring now specifically to FIGS. 5A, 5B, 6A, and 6B, another feature of universal cap 10 for sealing refrigerant service port 12 of air conditioning system 14 may be the inclusion of optional adjustment feature 64 included in select embodiments of universal cap 10. Adjustment feature 64 may be included with universal cap 10 for providing an adjustment feature that is designed so adjust the connection and/or seals 26 between universal cap 10 and refrigerant service port 12, or the like. As shown in the Figures, adjustment feature 64 may include rotatable knob 66 extending from a top of closed end 18 of cap body 16. Rotatable knob 66 may be in communication with thread down inset 70 inside of cap body 16. Wherein, rotatable knob 66 may be configured to move or raise and lower thread down inset 70 inside of cap body 16. Wherein, when connection end 20 is attached and sealed to refrigerant service port 12, or the like, adjustment feature 64 may be configured to lower thread down inset 70 to seat onto top 28 of refrigerant service port 12 for stabilizing the connection and seals 26 between connection end 20 of universal cap 10 and refrigerant service port 12. In select embodiments, as shown in the Figures, thread down inset 70 may include upper seal 38 being upper O-ring type seal 40 positioned in upper groove 42 in thread down inset 70. Wherein, when thread down inset 70 is lowered and seated onto top 28 of refrigerant service port 12, upper O-ring type seal 40 may be configured to be compressed against top 28 of refrigerant service port 12 for sealing refrigerant service port 12 and/or stabilizing the connection between universal cap 10 and refrigerant service port 12. In select embodiments, also as shown in the Figures, wherein thread down inset 70 may further include positioning protrusion 46 positioned between upper O-ring type seal 40 positioned in upper groove 42 in connection end 20 of cap body 16. Wherein, when connection end 20 is attached and sealed to refrigerant service port 12, adjustment feature 64 may be configured to lower positioning protrusion 46 further into interior 30 of refrigerant service port 12 for stabilizing the connection and seal(s) 26 between connection end 20 of universal cap 10 and refrigerant service port 12.

In select embodiments, universal cap 10 may be made of aluminum, brass, steel, the like, and/or any combinations thereof. However, the disclosure is not so limited, and other desired materials may be utilized for creating universal cap 10.

In sum, the instant disclosure provides universal cap 10 with quick disconnect fitting 52 for the high and/or low end service ports of A/C system 14, like those A/C systems commonly used in automobiles, cars, light truck, hd truck, both residential an commercial A/C units, the like, etc. The disclosed universal caps 10 may be designed to save lots of time and money, and may prevent environmental damages from leaks. The disclosed universal caps 10 may be designed to provide a quick simple solution to a rather large problem. A/C service port caps (plastic caps 1 from FIGS. 1A and 1B) at present use threading (internal threads 2 from FIGS. 1A and 1B) on the inside of the port for screwing the A/C service port cap on to the service port. These service ports are universal on the outside but inside there are many variations of cap sizes, threads and styles. They become hard to find the cap needed to replace, they are cheap plastic, and leak often. When the Schrader valve (valve 50) under the cap opens and pinches the o-ring seal under service port fitting and/or leaks on its own over time, the present plastic caps 1 are not made to hold refrigerant from leaking. When these Schrader valves leak it is hard to detect because when the gauges are hooked to the car they won't leak. It's upon removal of gauges that leaks occur.

A pair of leak proof universal low and high side service port universal caps 10 for any refrigerant, like 134a and/or 1234yf refrigerant, is disclosed herein. These universal caps 10 may be designed for use in both the high side and low sides of an A/C system 14 in a car, light truck, hd truck, hd equipment, the like, or any other A/C units with refrigerants, like HFC-134a refrigerant, the newer HFO-1234YF refrigerant, or any refrigerant used in the past or the future. To clarify, the disclosed universal caps 10 may be designed and/or sized to fit the various high and low side service ports for the various refrigerants, i.e. there could be one universal cap 10 sized for the high side service port of HFC-134a refrigerant, a second universal cap 10 sized for the low side service port of HFC-134a refrigerant, a third universal cap 10 sized for the high side service port of HFO-1234YF refrigerant, a fourth universal cap 10 sized for the low side service port of HFO-1234YF refrigerant, etc. The purpose of the disclosed universal caps 10 may be to make the caps easy to find, like when you hook a vehicle to the A/C machine it takes one low and one high side service port fitting from A/C service machine, gauges, or the cheap fill cans they sell in auto parts stores.

One purpose of the disclosed universal caps 10 may be to make caps easily accessible to find that are also leak proof.

Another purpose of the disclosed universal caps 10 may be to prevent refrigerant from leaking at service ports causing environmental issues by having those cfc gases released into the earth's environment and contributing to global warming, etc.

Another purpose of the disclosed universal caps 10 may be that, after doing an A/C service, when no leaks are found at the service ports 12, if the service ports 12 are capped off with the disclosed universal caps 10, they won't have to worry about leaks coming from the ports. In addition, at the time of fill, if the service port 12 has a slow leak, the disclosed leak proof universal caps 10 will contain the refrigerant in the A/C lines/system saving on the labor of evacuation, repair service port (sometimes replacing lines), vacuum, recharge, and the cost of lost refrigerants (new refrigerant 1234yf is very high at around $100.00 per pound).

Another purpose of the disclosed universal caps 10 may be to prevent leaks that occur when the Schrader valve (valve 50) leaks. With the current plastic caps 1, you will lose refrigerant. With refrigerant lost, you lose A/C system oil/lubrication causing more potential damages because just like your vehicle's engine, when low on oil it causes break down of other components in the engine, or at best, extra wear and tear on engine decreasing the life expectancy of your vehicle's engine. Same applies to the A/C system 14 when refrigerant and oil are low. Damages happen to many of the components in an A/C system 14. A/C can be a very expensive repair. So, for the cost of the disclosed universal caps 10, you will not have to worry about leaks at the service ports 12 and the A/C not working, which can save money on repairs, and be cold on hot days because the A/C system 14 is still working. Also, the technician will not have to go search all over for hard-to-find service port plastic caps 1, which often times requires the buying and returning of 10 or more plastic caps 1 before you get the correct one. As an example, say you need caps for a 134a Freon system, the instant disclosure may provide a single choice of a set for both low and high side leak proof universal caps 10. Or you can ask for a set of universal caps 10 for a 1234yf refrigerant, and they will sell you the disclosed universal caps 10. With the disclosed universal caps 10 you may be helping to keep the earth's air cleaner from all the refrigerant that leaks out into the atmosphere annually.

Universal cap 10 may seal similar to how an ac service port fitting does but it will not have the mechanism that opens Schrader valve and it will not have a place to hook the hose to as it is just a cap and not a gauge.

Universal cap 10 may have O-ring seal material (upper O-ring type seal 40) on inside top surface for added leak prevention.

In the second design with adjustment feature 64, outer sleeve 56 pulls up over cap body 16 and latches on with ball bearing members 58 to refrigerant service port 12 and the top of universal cap 10 has a thread down inset 70 that seats on top 28 and/or inside edge of refrigerant service port 12 for an even better leak stop and or way of knock off.

Universal cap 10 disclosed herein may be good for the environment as it may prevent leakage of refrigerant. In the event the Schrader valves (valve 50) start to leak, the refrigerant will not leave the vehicle keeping the a/c cold and because you are not losing refrigerant, you are not losing a/c oil, and it will not hurt the life of compressor and other components by losing lubricating oil, and or air moisture getting in system causing issues with other components.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A universal cap configured for sealing a refrigerant service port of an air conditioning system, the universal cap comprising:
   a cap body with a closed end and a connection end; and
   the connection end is configured to attach and seal the cap body to a universal quick disconnect exterior of the refrigerant service port;
   wherein the connection end of the cap body including a positioning protrusion, the positioning protrusion is sized to fit into an interior of the refrigerant service port, wherein, when the universal cap is attached to the refrigerant service port, the positioning protrusion is configured to aid in positioning and securing the universal cap on the refrigerant service port; and wherein the positioning protrusion is sized and configured not to contact or depress a valve pin of a valve in the refrigerant service port.

2. The universal cap of claim 1, wherein the universal cap is designed and configured to prevent refrigerant from leaking from the refrigerant service port, wherein the closed end of the cap body does not include any holes, openings, or fittings, wherein the only hole, opening or fitting of the cap body is via the connection end.

3. The universal cap of claim 1, wherein the connection end including at least one seal, the at least one seal is configured to seal the connection end to:

the universal quick disconnect exterior of the refrigerant service port;

a top of the refrigerant service port;

an interior of the refrigerant service port; or a combination thereof.

4. The universal cap of claim 3, wherein the at least one seal including:

an outer seal being an outer O-ring type seal positioned in an outer groove in the connection end of the cap body, wherein, when the universal cap is attached to the refrigerant service port, the outer seal is configured to compress against the universal quick disconnect exterior of the refrigerant service port; and an upper seal being an upper O-ring type seal positioned in an upper groove in the connection end of the cap body, wherein, when the universal cap is attached to the refrigerant service port, the upper seal is configured to compress against the top of the refrigerant service port.

5. The universal cap of claim 1, wherein the positioning protrusion is positioned between an upper seal being an upper O-ring type seal positioned in an upper groove in the connection end of the cap body, wherein, when the universal cap is attached to the refrigerant service port, the upper seal is configured to compress against the top of the refrigerant service port as the positioning protrusion is inserted and positioned inside of the interior of the refrigerant service port.

6. The universal cap of claim 1, wherein the connection end including a quick disconnect fitting, the quick disconnect fitting is configured to releasably attach the cap body to the universal quick disconnect exterior of the refrigerant service port.

7. The universal cap of claim 6, wherein the quick disconnect fitting including:

an inner body member configured to fit around the universal quick disconnect exterior of the refrigerant service port;

an outer sleeve configured to traverse along the inner body member; and a plurality of ball bearing members configured to move partially within a plurality of holes in the inner body member when the outer sleeve is slid down over the plurality of ball bearing members.

8. The universal cap of claim 7, wherein, when the universal cap is inserted onto the refrigerant service port with the inner body member around the universal quick disconnect exterior of the refrigerant service port and the outer sleeve is slid down over the plurality of ball bearing members, the plurality of ball bearing members are forced partially through the plurality of holes in the inner body member and into a locking slot in the universal quick disconnect exterior of the refrigerant service port, thereby locking the universal cap onto the refrigerant service port; and when the outer sleeve is slid up off of the plurality of ball bearing members, the plurality of ball bearing members are allowed to retract from the plurality of holes in the inner body member and out of the locking slot in the universal quick disconnect exterior of the refrigerant service port, thereby unlocking the universal cap from the refrigerant service port for removal of the universal cap.

9. The universal cap of claim 8 wherein, when the universal cap is locked onto the refrigerant service port via the plurality of ball bearing members positioned into the locking slot in the universal quick disconnect exterior of the refrigerant service port:

an outer seal being an outer O-ring type seal positioned in an outer groove in the connection end of the cap body is configured to be compressed against the universal quick disconnect exterior of the refrigerant service port for sealing the refrigerant service port; or an upper seal being an upper O-ring type seal positioned in an upper groove in the connection end of the cap body is configured to be compressed against the top of the refrigerant service port for sealing the refrigerant service port.

10. The universal cap of claim 9 wherein, when the universal cap is locked onto the refrigerant service port via the plurality of ball bearing members positioned into the locking slot in the universal quick disconnect exterior of the refrigerant service port:

the outer seal being the outer O-ring type seal positioned in the outer groove in the connection end of the cap body is configured to be compressed against the universal quick disconnect exterior of the refrigerant service port for sealing the refrigerant service port; and the upper seal being the upper O-ring type seal positioned in the upper groove in the connection end of the cap body is configured to be compressed against the top of the refrigerant service port for sealing the refrigerant service port.

11. The universal cap of claim 1 further comprising an adjustment feature, the adjustment feature including a rotatable knob extending from the closed end of the cap body, the rotatable knob is in communication with a thread down inset inside of the cap body, wherein the rotatable knob is configured to raise and lower the thread down inset inside of the cap body.

12. The universal cap of claim 11 wherein, when the connection end is attached and sealed to the refrigerant service port, the adjustment feature is configured to lower the thread down inset to seat onto a top of the refrigerant service port for stabilizing a connection and at least one seal between the connection end of the universal cap and the refrigerant service port.

13. The universal cap of claim 12, wherein the thread down inset includes an upper seal being an upper O-ring type seal positioned in an upper groove in the thread down inset, wherein, when the thread down inset is lowered and seated onto the top of the refrigerant service port, the upper O-ring type seal is configured to be compressed against the top of the refrigerant service port for sealing the refrigerant service port.

14. The universal cap of claim 13, wherein the thread down inset further includes a positioning protrusion positioned between the upper O-ring type seal positioned in the upper groove in the connection end of the cap body, wherein when the connection end is attached and sealed to the refrigerant service port, the adjustment feature is configured to lower the positioning protrusion further into the refrigerant service port for stabilizing the connection and seal between the connection end of the universal cap and the refrigerant service port.

15. The universal cap of claim 1, wherein the universal cap is configured and designed for a low side refrigerant service port of a low pressure refrigerant side of the air conditioning system or a high side refrigerant service port of a high pressure refrigerant side of the air conditioning system, wherein the universal cap is designed and configured for:
- a low side HFC-134a refrigerant service port;
- a high side HFC-134a refrigerant service port;
- a low side 1234yf refrigerant service port; or
- a high side 1234yf refrigerant service port.

16. A universal cap configured for sealing a side refrigerant service port of an air conditioning system, the universal cap comprising:
- a cap body with a closed end and a connection end;
- the connection end is configured to attach and seal the cap body to a universal quick disconnect exterior of the low side refrigerant service port; and
- an adjustment feature, the adjustment feature including a rotatable knob extending from the closed end of the cap body, the rotatable knob is in communication with a thread down inset inside of the cap body, wherein the rotatable knob is configured to raise and lower the thread down inset inside of the cap body;
- wherein, when the connection end is attached and sealed to the refrigerant service port, the adjustment feature is configured to lower the thread down inset to seat onto a top of the refrigerant service port for stabilizing a connection and at least one seal between the connection end of the universal cap and the refrigerant service port;
- wherein the thread down inset includes an upper seal being an upper O-ring type seal positioned in an upper groove in the thread down inset, wherein, when the thread down inset is lowered and seated onto the top of the refrigerant service port, the upper O-ring type seal is configured to be compressed against the top of the refrigerant service port for sealing the refrigerant service port; and
- wherein, the thread down inset further includes a positioning protrusion positioned between the upper O-ring type seal positioned in the upper groove in the connection end of the cap body, wherein when the connection end is attached and sealed to the refrigerant service port, the adjustment feature is configured to lower the positioning protrusion further into the refrigerant service port for stabilizing the connection and seal between the connection end of the universal cap and the refrigerant service port.

17. The universal cap of claim 16, wherein the universal cap is designed and configured for:
- a low side HFC-134a refrigerant service port;
- a low side 1234yf refrigerant service port;
- a high side HFC-134a refrigerant service port; or
- a high side 1234yf refrigerant service port.

\* \* \* \* \*